Figures 1, 4:
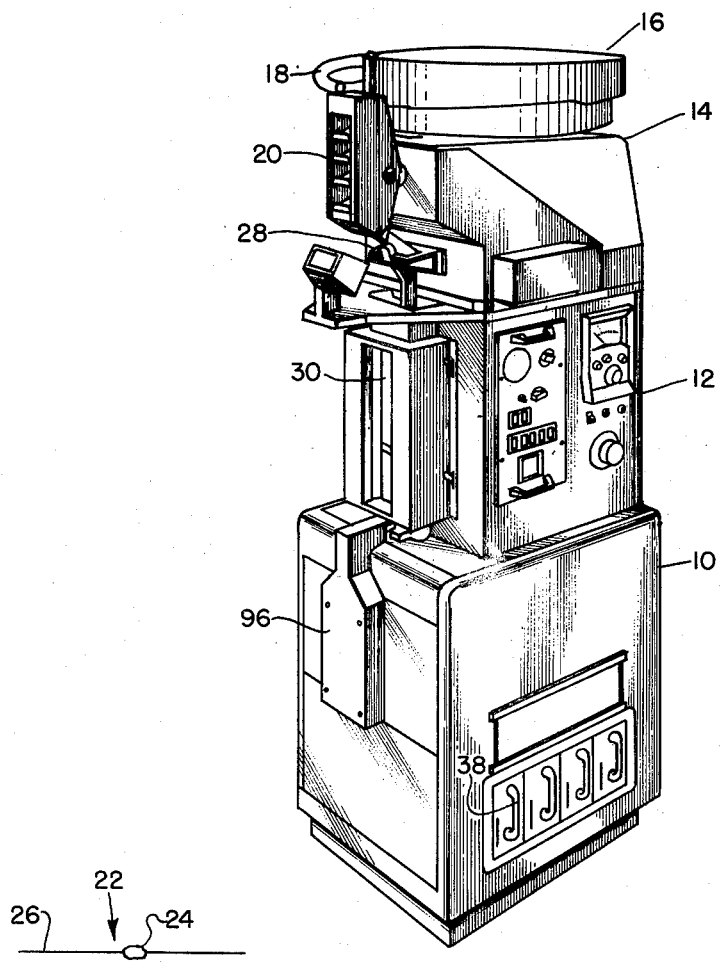

Oct. 5, 1965  M. WIESLER ETAL  3,209,907
SORTING MACHINE

Filed March 18, 1963  3 Sheets-Sheet 1

*INVENTORS*
MORDECHAI WIESLER
VIRGILIJUS MARTINONIS
BY
*Morse & Altman*
ATTORNEYS INVENTORS
MORDECHAI WIESLER
VIRGILIJUS MARTINONIS
BY Morse & Altman

ATTORNEYS

United States Patent Office 3,209,907
Patented Oct. 5, 1965

3,209,907
SORTING MACHINE
Mordechai Wiesler and Virgilijus Martinonis, Brookline, Mass., assignors to Transistor Automation Corp., Cambridge, Mass., a corporation of Massachusetts
Filed Mar. 18, 1963, Ser. No. 265,764
2 Claims. (Cl. 209—74)

This invention relates generally to sorting machines and more particularly is directed towards a new improved apparatus for classifying electronic components according to their functional characteristics under elevated temperature conditions. In some aspects this invention is directed towards improvements in the automatic sorting machine disclosed in copending application Serial No. 242,475, filed December 5, 1962.

In the production of various types of electronic components such as semi-conductor diodes, for example, each component of a group of similar components may vary in its operating characteristics even though all of the components were manufactured under strict conditions of quality control. The variations from one component to another arise from the fact that in semi-conductor devices even the slightest variation in the proportions of the materials that constitute the semi-conducting mass will result in large changes in the functional characteristics of the finished component.

The actual proportions of materials of a semi-conductor device are therefore extremely critical and it is virtually impossible to manufacture a large group of components having identical operating characteristics. In addition semi-conductor devices are quite sensitive to temperature and their design characteristics tend to deteriorate as their temperature increases. Since electronic components of this type normally function under somewhat elevated ambient temperature conditions, it is desirable that mass produced electronic components, having generally similar design functional characteristics, be sorted according to their actual functional characteristics as determined under normal operating temperatures.

Accordingly it is an object of the present invention to provide an apparatus for use in automatically sorting components according to their functional characteristics at elevated temperatures.

Another object of this invention is to provide improvements in automatic sorting machines.

Still another object of this invention is to provide an efficient and dependable automatic sorting machine adapted to test components at selected temperature levels.

More particularly, this invention features a machine for use in the automatic testing and sorting of a quantity of generally similar components into groups of components having substantially identical characteristics. As a feature of this invention means are provided for raising the temperature of the components and testing them under raised temperature conditions. This invention also features a novel heating system for raising the temperature of components while being fed therethrough into a testing station located within the heating system.

According to the invention all of the actuating mechanism for the testing and sorting portions of the machine are located apart from the heating system so as not to be affected by it. As another feature of this invention, the portion of the system wherein components are being heated prior to testing may be readily opened for access to these components to correct any malfunction or clear any jamming of the apparatus. According to the invention the heating system is of low mass and so arranged as to provide a close coupling between the heat source and the test station.

Figure 2:
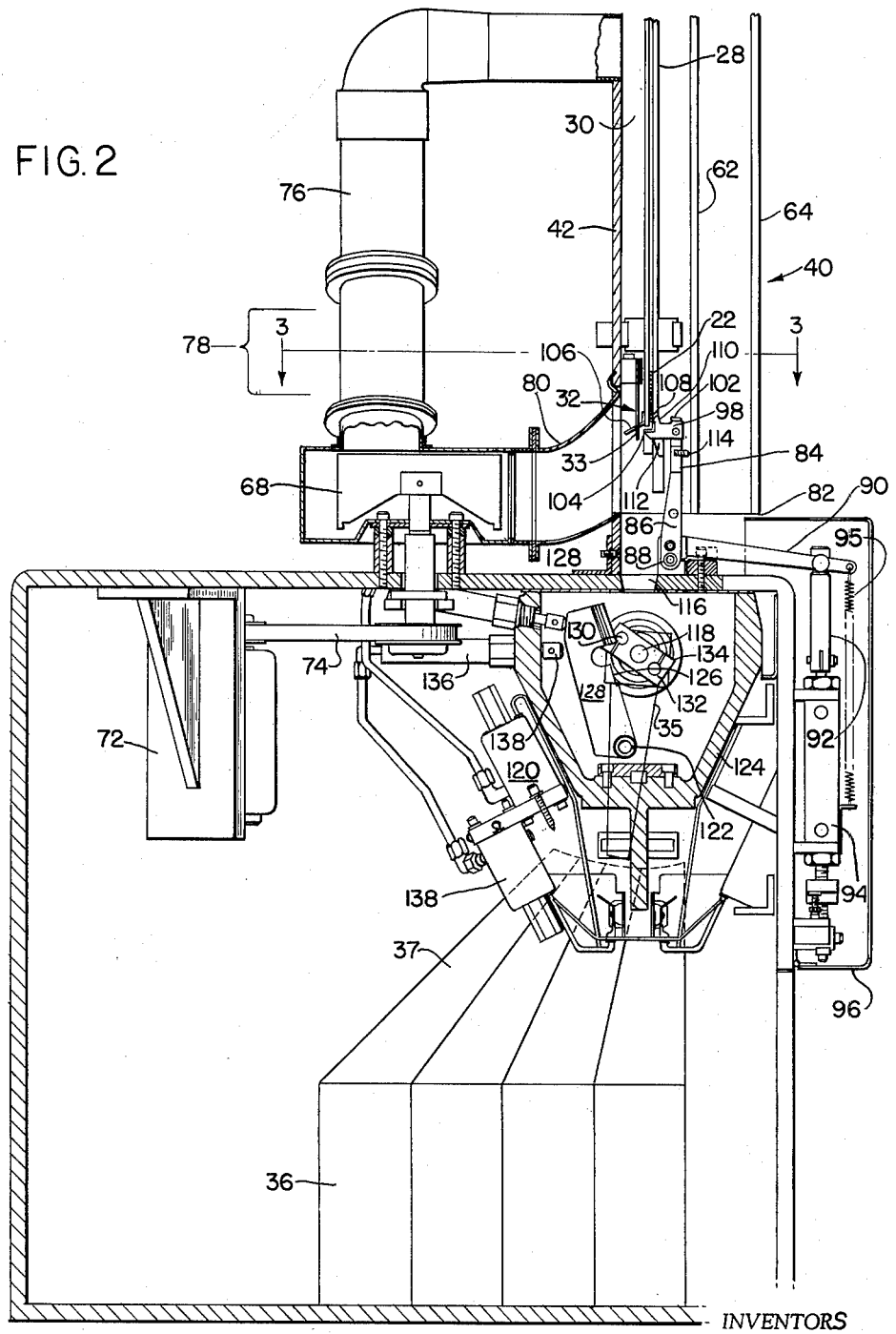
Figure 3:
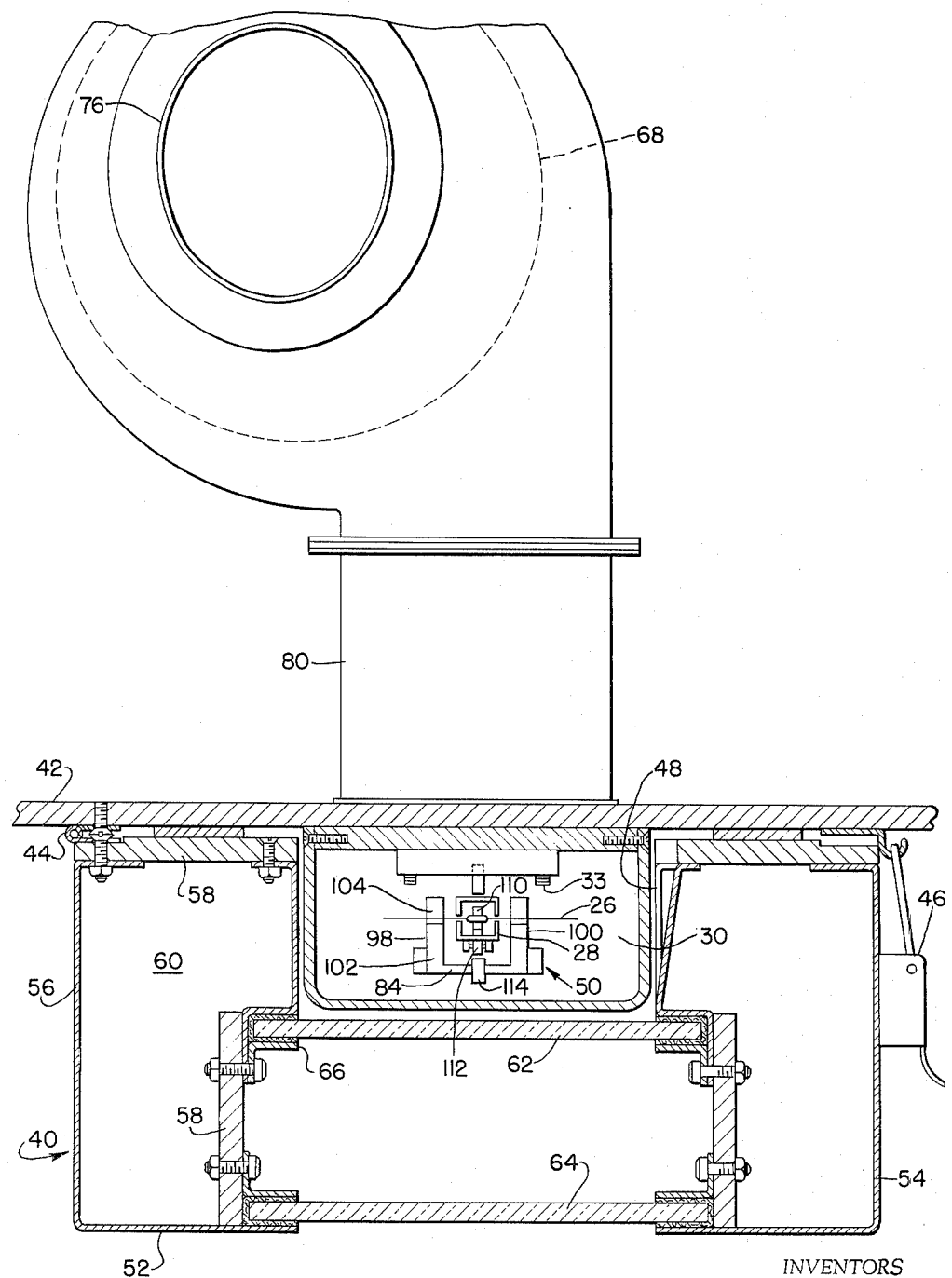

But these and other features of the invention along with further objects and advantages thereof will become more readily apparent from the following detailed description of a preferred embodiment of the invention, with reference being made to the accompanying drawings, in which FIGURE 1 is a view in perspective of a sorting apparatus made according to the invention;
FIGURE 2 is a detail sectional view in side elevation showing the major portions of the apparatus;
FIGURE 3 is a cross-sectional view taken along the line 3—3 of FIGURE 2; and
FIGURE 4 is a view in side elevation of a component of the type that may be processed by this invention.

Referring now to the drawings and to FIGURE 1 in particular, there is illustrated an apparatus for use in testing and classifying components according to their common operating characteristics. The apparatus generally comprises a base portion 10, a testing portion 12 and a feeding portion 14. The feeding portion includes a vibratory bowl feeder 16 which is adapted to deliver a controlled flow of components from a curved tube 18 one by one onto a baffled chute 20 which is adapted to orient the components into a horizontal attitude. A typical component that may be tested by the apparatus is the semi-conductor diode 22 of the sort illustrated in FIGURE 4, and which comprises a miniature body portion 24 and extended wire leads 26.

The components are delivered one by one from the base of the chute 20 into a guide track 28, the guide track curving inwardly towards the housing for the motor which drives the vibratory bowl feeder 16. The guide track then extends vertically downward through a heating chamber 30 located on the side of the testing portion 12.

The heating chamber has sufficient length so that components which will accumulate in the track 28 within the chamber will be able to come to ambient temperature before being tested at a test station 32 located near the base of the heating chamber. An escapement mechanism 34 is provided to transfer components one by one from the track 28 to test contacts 33 and thereupon to drop the component into a pivoted funnel 35 located directly below the test station and aligned in response to a signal developed at the test station with one of a plurality of chutes 37 each feeding to a bin 36. The bins may be in the form of drawers having each a handle 38 for ready removal once they have become filled.

The testing portion of the apparatus is generally organized about the heating chamber 30 in which the components are tested. As best shown in FIGURE 3, the heating chamber is formed by an insulated door 40 and a vertical wall 42 which forms part of the housing for the testing portion 12. A series of hinges 44 connect the left-hand edge of the door 40 to the wall 42 as shown in FIGURE 3, and a latch device 46 provided on the right-hand side for locking the door tightly against the wall 42.

As best shown in FIGURE 3, the door 40 is of generally boxed construction and is formed with a longitudinal channel 48 which forms a vertical chimney or riser for heated air when the door is in the closed position shown. The channel 48 is of sufficient dimensions to accommodate the guide track 28 which extends vertically down the wall 42 and the escapement mechanism 34. The door is constructed with boxed members 52 and 54 which are formed by sheet metal panels 56 joined by frame members 58 which define a chamber filled with a suitable insulating material such as spun glass 60 or the like. The two side members 52 and 54 are rigidly connected by a pair of panels of plate glass 62 and 64 mounted in parallel spaced relation by means of channel members 66. It will be understood that the glass panels permit direct viewing of the operation of the escapement and the feeding of the components down the guide track 28. The spacing of the glass panels provides effective insulation and, in cooperation with the insulated side members 52 and 54, effectively insulates the heating chamber 30 from changes in ambient temperature as well as to provide a cool outer surface for the machine. It will also be understood that the door 40 may be readily opened by releasing the latch 46. This feature permits ready access to the escapement and to the guide track in the event of a malfunction.

Heated air is delivered to the chamber 30 by means of a centrifugal blower 68 mounted behind the wall 42 and driven by a motor 70 mounted to bracket 72 and connected to the blower by means of a belt and pulley arrangement 74. The blower draws air downwardly through a tube 76 which communicates at its upper end with the upper end of the chamber 30. Heating elements are mounted at the lower end of the tube 76 near the blower 68 and are provided with leads 78 for connection to a suitable power source. The heated air which is drawn in by the blower is discharged through a curved conduit 80 upwardly into the lower end of the test chamber 30. In order to prevent the entry of cool air drafts into the chamber 30 the insulated door 40 is open at its lower end as indicated by the reference character 82. This opening is generally aligned with the blower to permit a small amount of heated air to discharge out of the lower end of the chamber and to form a curtain of heated air which effectively blocks the entry of cool air. The upper end of the chamber 30 is opened to the atmosphere so that a certain portion of the heated air is discharged from the apparatus, and a portion of the air is also drawn back into the tube 36 for re-circulation.

This arrangement for heating the tested components is particularly efficient because the heating chamber 30 is relatively small with the advantage of having a low thermal mass. This permits close control of the temperature within the chamber. By organizing the heating elements in close proximity to the test chamber a close coupling is provided between the air in the chamber 30 and the heating elements. It will be appreciated that the combination of low thermal mass plus close coupling between the heater and test chamber permits very close control over the heat within the chamber as well as to permit a rapid temperature recovery if the chamber is opened for any reason. Typically, the temperature recovers in the air chamber within three minutes after the door 40 has been opened and closed for any reason.

Referring now more particularly to the escapement mechanism for transferring individual components from the track 28 to the test contacts 33, reference is made to FIGURES 2 and 3. As shown, the escapement mechanism includes an arm 84 which extends vertically into the heating chamber 30 and is pivoted at its lower end to a block 86 by a pin 88. Fastened rigidly to the arm 84 and extending generally forward in a horizontal direction is a lever 90, which is pivotally engaged at its outer end to the upper end of a piston rod 82. As best seen in FIGURE 2, the piston rod is drivingly connected to a pneumatic cylinder 84 mounted on the vertical front wall of the base portion 10. A coiled spring 85 engages the lever 90 at one end and to the cylinder 94 at its other end to urge the lever in a normally down position so that the arm 84 will be biased normally in a clockwise direction as viewed in FIGURE 2. To protect the arm actuating mechanism the cylinder 94 and lever 90 are enclosed in a housing 96.

The arm 84 has mounted at its upper end a pair of horizontally extending fingers 98 and 100. These fingers are spaced from one another and extend on either side of the guide track 28 as best seen in FIGURE 3. Each finger is identical in profile, each having an upper shoulder portion 102 and a lower portion 104. The upper shoulder portion 102 functions to hold the accumulated stack of components 22 in position while the lowermost component is being released for testing. The lowermost component is picked up by the lower shoulder 104 upon a counter-clockwise movement of the arm 84 which transfers the lowermost component from the track 28 out through an opening 106 against the test contacts 33. As shown in FIGURE 2, the lower portion of the track 28 is formed with a shoulder 108 communicating with the opening 106 and upon which a component 22 is deposited upon actuation of a trigger release 110. The release 110 is in the form of an elongated pawl and is pivoted to the lower portion of the track 28 by means of a pin 112. The upper portion of the trigger release is formed with a catch whereby, when the release is normally biased in a counter-clockwise direction as by a spring (not shown), the upper catch of the release will engage the lowermost component of those in the track 28. The arm 84 is pivoted towards the track when the upper shoulder 102 will move in under the components and a center screw 114 will strike the lower end of the trigger release to bias it in a clockwise direction, causing the catch portion to disengage with the component. As a result, the components will drop one position until the lowermost one rests on the shoulder 102. When the arm 84 is again biased in a clockwise direction, the trigger release will bias in a counter-clockwise direction and return to engagement with the components 22. The single released component which has been resting on the shoulder 102 will drop down onto the shoulder 108 on withdrawal of the shoulder 102. When the escapement is again actuated, the component which is on the shoulder 108 will be pushed to the left in FIGURE 2 by the fingers 98 and 100 and carried against the contacts 33. At this point the component will be resting on the lower shoulder 104. As the arm again biases in a clockwise direction, the component will strike the rear face of the track 28 and be stripped from the lower shoulder 104 to drop downwardly away from the escapement. It will be seen in FIGURE 2 that the shoulder 104 is below the shoulder 108 so that the component cannot be carried back into the opening 106. It will be understood that on each cycle of the machine an additional component will be released from those collected in the track 28.

From the test station 32 the component is dropped down to an opening 160 formed in the top wall of the base portion and into a pivoted funnel 35. As shown in FIGURE 2, the funnel 35 has its open end directly in register with the opening 116 and is fixed to a horizontal axle 118. The axle 118 in turn is mounted for limited angular movement about its longitudinal axis by means of an actuating mechanism which includes, in this embodiment, four cams 120 mounted side by side along a common shaft 122. The shaft 122 is mounted at the base of an inner housing 124 suspended from the top wall of the base portion 10 and below the escapement mechanism. Each of the cams 120 is formed with a pair of driving faces 126 and 128 with all of the lower driving faces 128 being of the same profile. However, the upper driving face 126 varies from one cam to another with each cam having a driving face 128 which differs in its forward extent.

Each pair of the driving faces 126 and 128 are adapted to engage in bridging relation with a pair of parallel rods 130 and 132. These rods are mounted parallel to the axle 118 by means of rectangular mounting plates 134. It will be understood that as a cam 120 is pivoted clockwise about its shaft 22 its driving faces will engage the rods 130 and 132 to rotate the axle 118 into a particular angular position in which the rods and the driving faces are locked against one another. It will also be understood that each cam will pivot the axle into a different angular position by reason of the difference in extent of the driving faces 128.

The several cams 120 are pivoted by means of a pneumatic piston and cylinder 136 mounted to the housing 124 and having a driving block 138 adapted to bear against the left hand edge of the cam. It will be understood that each cam is provided with its own piston and cylinder so that any selected cam may be actuated by operation of its associated cylinder. In practice, a solenoid actuated valve 138 is provided to control each cylinder 136 with the solenoids being operated by a control system which functions in response to signals developed at the test station 32. The particular circuitry for developing signals according to the characteristics of the tested components forms no part of this invention since the components may be tested for a variety of different characteristics. It is only necessary that a signal be developed according to whatever selected characteristics are being tested and the signal be relayed to actuate a particular solenoid 138. Thus, any appropriate cylinder and cam may be actuated to rotate the axle 118 and postion the funnel 35 into register with a chute 37 and bin 36 corresponding with components having similar characteristics. In this fashion the components are tested and sorted according to common characteristics.

The apparatus disclosed herein includes several novel features which make it a particularly useful and efficient machine. For example, all of the driving units for actuating the various portions of the machine are located apart from the heated test zone. For example, the pneumatic cylinder 94 for actuating the escapement 34 is mounted on the outside of the base 10 and connects to the escapement by a lever arrangement. Similarly, the pivoted chute and its associated driving mechanism is located below the testing station so that the driving elements are not affected in any way by the high temperature at the test station. By arranging the heating elements and the blower close to the test station and also by employing a relatively small thermal mass, a very close coupling is provided which makes possible accurate control over the temperature and rapid return to the desired temperature level if the chamber is opened for any reason.

While the invention has been described with particular reference to the illustrated embodiment, it will be understood that numerous modifications will appear to those skilled in the art. It will also be understood that the above description and accompanying drawings should be taken as illustrative of the invention and not in a limiting sense.

Having thus described the invention, what we claim and desire to obtain by Letters Patent of the United States is:

1. An apparatus for testing components under high temperature conditions and sorting them according to common characteristics, comprising a test station, thermal insulating walls enclosing said station and defining an open ended tubular heating chamber extending in a generally vertical direction above said station, a guideway extending vertically into said chamber from the upper end thereof, feeding means for delivering components onto said guideway, escapement means mounted within said chamber for transferring said components one by one from said guideway to said test station and then release said components after it has been tested, escapement actuating means mounted exterior to said chamber and drivingly connected to said escapement means, means for circulating heated air through said chamber, a funnel pivotally mounted exterior to said chamber below said test station in position to receive each component after it has been tested and released, a plurality of receptacles mounted below said funnel and means responsive to a signal developed at said test station for pivoting said funnel to a selected angular position to discharge a tested component into a selected one of said receptacles, said funnel pivoting means including a pair of horizontally extending spaced abutments fixed to said funnel, a plurality of cams each having a distinctive profile disposed oppositely said abutments and selectively actuated driving means for moving said cams selectively into engagement with said abutments to bias said funnel to a selected angular postion corresponding to the profile of the particular cam.

2. An apparatus for testing components under high-temperature conditions and sorting them according to common characteristics, comprising a test station, thermal insulating walls enclosing said station and defining a tubular heating chamber extending in a generally vertical direction, means for heating and pumping air through said chamber, feed means for delivering components through the upper end of said chamber into the interior thereof, a track extending vertically through said chamber for guiding said components therethrough and temporarily stacking a quantity of components therein, escapement means located in the lower portion of said chamber and cooperatively associated with said track for transferring said components one by one from said track to said test station and then release each component after it has been tested, a funnel pivotally mounted exterior to said chamber and below said test station in position to receive each component after it has been tested and released, a plurality of receptacles mounted below said funnel and means responsive to a signal developed at said test station for pivoting said funnel to a selected angular position to discharge a tested component into a selected one of said receptacles, at least one of said thermal insulating walls being transparent and at least one of said thermal insulating walls being moveably mounted.

References Cited by the Examiner
UNITED STATES PATENTS

| 2,999,587 | 9/61 | Campbell | 209—81 X |
| 3,039,604 | 6/62 | Bickel | 209—75 |
| 3,049,232 | 8/62 | Johnston | 209—111.5 |

ROBERT B. REEVES, *Primary Examiner.*